United States Patent
Zhang et al.

(10) Patent No.: US 12,517,750 B2
(45) Date of Patent: Jan. 6, 2026

(54) UNIVERSAL NAMING CONVENTION (UNC) PATH REDIRECTION BETWEEN LOCAL SYSTEM AND REMOTE SYSTEM

(71) Applicant: Omnissa, LLC, Mountain View, CA (US)

(72) Inventors: Huanhuan Zhang, Beijing (CN); Haiwei Zhao, Beijing (CN); Feng Yan, Beijing (CN); Bo Steven Liu, Beijing (CN); Kun Shi, Beijing (CN); Wu Bai, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 791 days.

(21) Appl. No.: 17/811,688

(22) Filed: Jul. 11, 2022

(65) Prior Publication Data
US 2023/0409364 A1 Dec. 21, 2023

(30) Foreign Application Priority Data
Jun. 17, 2022 (WO) ................ PCT/CN2022/099333

(51) Int. Cl.
| | | |
|---|---|---|
| G06F 15/16 | (2006.01) | |
| G06F 9/38 | (2018.01) | |
| G06F 9/455 | (2018.01) | |
| G06F 9/54 | (2006.01) | |

(52) U.S. Cl.
CPC ........ *G06F 9/45558* (2013.01); *G06F 9/3897* (2013.01); *G06F 9/541* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

2022/0191288 A1\* 6/2022 Harshith ............... H04L 67/141

\* cited by examiner

*Primary Examiner* — Wing F Chan
*Assistant Examiner* — Andrew Woo
(74) *Attorney, Agent, or Firm* — Kim & Stewart LLP (57) ABSTRACT

The disclosure provides a method for universal naming convention (UNC) path redirection between a local desktop and a remote desktop. The method generally includes selecting, by a client device in an internal network, via an application running on a remote desktop in an external network, to open a UNC path for a resource located in the internal network. A firewall restricts the external network to access the resource located in the internal network. The method generally includes receiving, at the client device, from the remote desktop, via a virtual channel between the external network and the client device in the internal network, a message indicating to open the UNC path. The method generally includes opening, by the client device, via a local application of the client device, the UNC path to access the resource located in the internal network.

17 Claims, 6 Drawing Sheets

UNIVERSAL NAMING CONVENTION (UNC) PATH REDIRECTION BETWEEN LOCAL SYSTEM AND REMOTE SYSTEM

CROSS-REFERENCE TO RELATED APPLICATION(S)

This application claims benefit of and priority to International Application No. PCT/CN2022/099333, filed Jun. 17, 2022, herein incorporated by reference in its entirety as if fully set forth below and for all applicable purposes.

INTRODUCTION

In a virtual desktop infrastructure (VDI) environment, a local client device (e.g., a personal computer (PC) or mobile device) can access a remote virtual or physical desktop or remote application that is running on a remote device and displayed at the local client device. For instance, a virtual desktop may be hosted on a central infrastructure known as virtual desktop infrastructure (VDI), and may be rendered on a client device using a remote display protocol. At the client device, a user may interact with the virtual desktop using peripheral devices (e.g., keyboard and/or mouse) associated with the client device, and operating system (OS) events generated based on the user's inputs are captured by a VDI client (e.g., a user-side interface of the remote desktop) of the client device and redirected from the client device to the remote device on which the virtual desktop is located. One example of a modern platform for running and delivering virtual desktops and applications across a hybrid cloud is Horizon™, made commercially available from VMware, Inc. of Palo Alto, California.

An end user in a VDI environment may desire to open a Universal Naming Convention (UNC) link from the remote desktop. UNC specifies a common syntax to describe the location of a network resource (e.g., a shared file, director, printer, or the like) in a computing device. In a Windows operation system (OS), the UNC is referred to as a "Network path" with a format \\ComputerName\SharedFolder\Resource. The UNC link may be to a network resource at the client device or at another device or storage within a same network as the client device. However, the user may not be able open the UNC link from a remote desktop to access the network resource.

For example, the remote desktop may be restricted (e.g., by a firewall policy) from accessing the network of the client device, such as due to an Internet isolation policy. Today's enterprises often rely on defense-in-depth mechanisms (e.g., multiple layers of security defense controls used to provide redundancy in the event a security control fails) to protect endpoint computing devices from security risks (e.g., malware infection). Malware is malicious software that, for example, disrupts network operations and gathers sensitive information on behalf of an unauthorized third party. Targeted malware may employ sophisticated methodology and embed in the target's infrastructure to carry out undetected malicious activities. In particular, once malware gains access to an endpoint, the malware may attempt to control the device and use lateral movement mechanisms to spread to other endpoints and critical assets of an enterprise. Internet isolation is one way to reduce security risks from the Internet. Internet isolation is a technology that contains Internet access (e.g., web-browsing) inside an isolated environment, like a sandbox or a virtual machine (VM), in order to protect computing devices from any malware the user my encounter. Internet isolation may be implemented locally on a computing device or remotely on a server.

Where the user is not be able open the UNC link from the remote desktop to access the network resource, in order to open the UNC link in the VDI environment, the user first manually transfers (e.g., copies) the UNC link from the remote desktop to the local device. However, performing multiple operations by the user to open the UNC link may lead to a poor user experience.

In one illustrative example, a user is working on a client device in an internal network that is isolated from Internet access. The user may log in to a remote desktop in an external network to use applications with Internet access, such as email. In the remote desktop, the user may need to open a UNC link to access a resource at the client device or at another location in the internal network. For example, the user may receive an email in the remote desktop with a UNC link to a file on an internal file server in the internal network. Because the internal network is isolated, the user cannot access the resource from the remote desktop. Instead, the user must first copy the UNC link from the remote desktop. For example, Horizon Client™, a remote desktop application made commercially available from VMware, Inc. of Palo Alto, California, offers a clipboard redirection feature which supports copying of content between local and remote systems. The user must then switch to the local desktop, paste the UNC link to the local desktop, and open the UNC link from the local desktop using a local application to retrieve the resource from the internal file server. Transferring files and switching between the remote and local desktops takes time and reduces efficiency for the user. Further, for a user that is using only one display screen/monitor, switching between remote and local desktop provides a poor user experience and further reduces the user's productivity. In addition, the user may need to have knowledge of the VDI environment to understand how to open the UNC link.

Accordingly, there is a need in the art for improved remote display techniques to seamlessly open a UNC link in a VDI using a local application.

It should be noted that the information included in the Introduction section herein is simply meant to provide a reference for the discussion of certain embodiments in the Detailed Description. None of the information included in this Introduction should be considered as an admission of prior art.

SUMMARY

The technology described herein provides a method for UNC path redirection between a local desktop and a remote desktop. The method generally includes selecting, by a client device in an internal network, via an application running on a remote desktop in an external network, to open a UNC path for a resource located in the internal network, wherein a firewall restricts the external network to access the resource located in the internal network. The method generally includes receiving, at the client device, from the remote desktop, via a virtual channel between the external network and the client device in the internal network, a message indicating to open the UNC path. The method generally includes opening, by the client device, via a local application of the client device, the UNC path to access the resource located in the internal network.

Further embodiments include a non-transitory computer-readable storage medium storing instructions that, when executed by a computer system, cause the computer system to perform the method set forth above, and a computer system including at least one processor and memory configured to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for UNC path redirection between a client device and a remote desktop. Aspects allow a user to seamlessly open a UNC link to a network resource located in an internal network, from within a remote desktop located in an external network, using a local application of the client device without further interaction from the user. As used herein, a local application may refer to a software application installed on a client device.

In some embodiments, as discussed in more detail below, a VDI environment includes a UNC redirect network provider, an applications programming interface (API), and a UNC helper module. In some embodiments, when the user selects to open a UNC path, the UNC redirect network provider checks with the UNC helper module whether the UNC path is to be redirected and, if the UNC path is to be redirected, the UNC redirect network provider reports that the UNC redirect network provider is the owner of the UNC path. In this case, the VDI, e.g., via the API, remote desktop server, and/or UNC helper module, will redirect the UNC to the client device to open the UNC path. In some embodiments, a virtual channel between the remote desktop in an external network and the client device in an internal network is used by the VDI to request the client device to open to the redirected UNC path. In some embodiments, the client device finds a local application and opens the UNC path to access a resource in the internal network. The UNC redirect network provider and UNC helper enables the UNC path to be redirected to the client device. Further, use of the virtual channel may enable the VDI to request the client device to open the redirected UNC path without violating a firewall that restricts the external network from accessing the internal network.

In an illustrative embodiment, a user of the remote desktop can open an email using an application (e.g., Microsoft Outlook made commercially available from Microsoft, Corp. of Redmond, Washington) running on the remote desktop. The email may contain a UNC link to a file, with a file format (e.g., txt, mp4, ppt, html, jpg, excel, word, or other file format) that the remote desktop supports opening. The UNC path redirection described herein may enable the user to select to open the UNC link on the remote desktop and the UNC link will instead be opened in the local application running on the client device as though the local application were an application running on the remote desktop and without additional user interaction to open the UNC link. In certain aspects, a window of the local application is displayed within a window of the remote desktop displayed on the client device, such that the local application appears to be running in the remote desktop while it is actually running on the client device.

Figure 1:
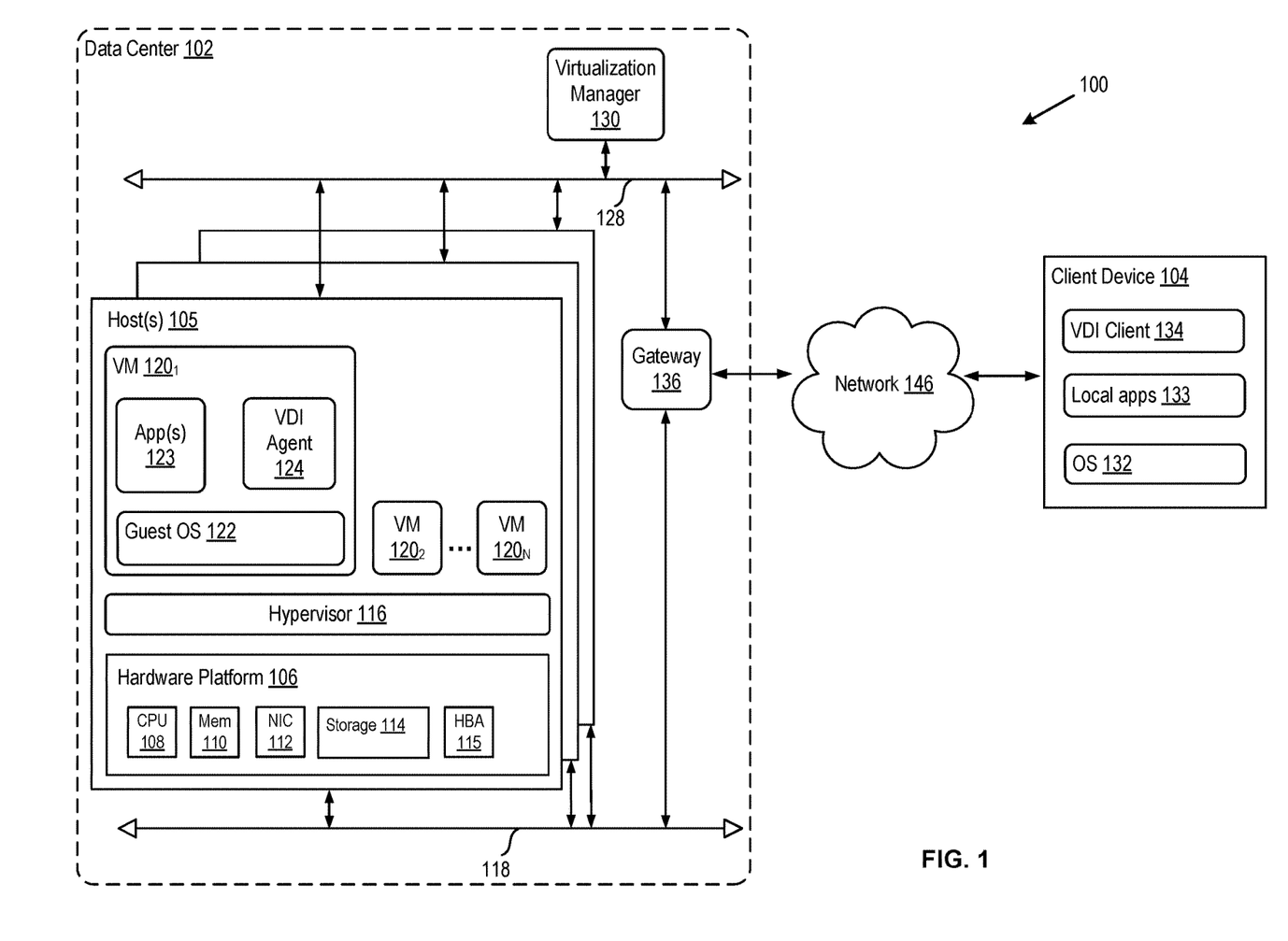
FIG. 1 depicts a block diagram of a VDI system in which one or more embodiments of the present disclosure may be implemented.

FIG. 1 depicts a block diagram of a VDI system 100 in which one or more embodiments of the present disclosure may be implemented. VDI system 100 comprises a client device 104 and a data center 102, connected by a network 146. Network 146 may be, for example, a direct link, a local area network (LAN), a wide area network (WAN) such as the Internet, another type of network, or any combination thereof.

Client device 104 is a physical device, such as a general purpose desktop computer or mobile computer. A mobile computer may be, for example, a laptop, a mobile phone, or a tablet computer. Client device 104 includes VDI client 134, operating system (OS) 132, and local applications 133. In certain embodiments, VDI client 134 runs on top of OS 132. OS 132 may be a standard, commodity operating system.

VDI client 134 is a user-side interface of a virtualized desktop running on one of virtual machines (VMs) 120. As used herein, a "virtualized desktop" or "remote desktop" is a desktop running on one of VMs 120 that is displayed remotely on client device 104, as though the remote desktop were running on client device 104. By opening VDI client 134, a user of client device 104 accesses, through network 146, a remote desktop running in data center 102, from any location, using client device 104. Frames of the remote desktop running on VM 120 are transmitted to VDI client 134 at a certain frame rate using a remote display protocol such as VMware® Blast™, or Microsoft® Remote Desktop Protocol (RDP)™. After transmission, the frames are displayed on client device 104 for interaction by a user. Client device 104 sends user inputs to VM 120 for processing on VM 120 of data center 102, taking processing load off client device 104. Such centralized and automated management of remote desktops provides increased control and cost savings. VDI client 134 may be, for example, VMware® View™, or a special purpose thin client such as those available from Dell, HP, NEC, Sun Microsystems, Wyse, and others.

Client device 104 may include one or more local applications 133 installed thereon. Local applications 133 may include any software program. Illustrative examples of local applications include word processing applications, image and/or video editing tools, and the like. In some embodiments, client device 104 may configure one or more of local applications 133 as file-handler for one or more file types on a remote desktop (e.g., VM $120_1$).

As the user interacts with the virtual desktop, such as using a mouse and keyboard, the user input is redirected by VDI client 134 to VDI agent 124.

Data center 102 includes host(s) 105, a virtualization manager 130, a gateway 136, a management network 128, and a data network 118. Although the management and data network are shown as separate physical networks, in some implementations the management network is logically isolated from the data network using different VLAN identifiers. Each of hosts 105 may be constructed on a server grade hardware platform 106, such as an x86 architecture platform. For example, hosts 105 may be geographically co-located servers on the same rack.

Host 105 is configured to provide a virtualization layer, also referred to as a hypervisor 116, that abstracts processor, memory, storage, and networking resources of hardware platform 106 into multiple VMs $120_1$ to $120_N$ (collectively referred to as VMs 120 and individually referred to as VM 120) that run concurrently on the same host 105. Hypervisor 116 may run on top of the OS in host 105. In some embodiments, hypervisor 116 can be installed as system level software directly on hardware platform 106 of host 105 (often referred to as "bare metal" installation) and be conceptually interposed between the physical hardware and the guest OSs 122 executing in VMs 120. In some implementations, hypervisor 116 may comprise system level software as well as a "Domain 0" or "Root Partition" VM, which is a privileged machine that has access to the physical hardware resources of host 105. In this implementation, one or more of a virtual switch, virtual tunnel endpoint (VTEP), etc., along with hardware drivers, may reside in the privileged VM. Although the disclosure is described with reference to VMs, the teachings herein also apply to other types of virtual computing instances (VCIs), such as containers, Docker containers, data compute nodes, isolated user space instances, namespace containers, and the like. One example of hypervisor 116 that may be used is a VMware ESXi™ hypervisor provided as part of the VMware vSphere® solution made commercially available from VMware, Inc. of Palo Alto, California.

Each VM 120 includes a guest OS 122, one or more applications 123 and a VDI agent 124. Application(s) 123 and VDI agent 124 run on top of guest OS 122. Guest OS 122 may be a standard, commodity operating system. An application 123 may be any software program, such as a word processing program.

VDI agent 124 is a desktop virtualization program that connects to VDI client 134 of client device 104, through network 146. The connection between VDI agent 124 and VDI client 134 may be authenticated, such as through a username and password combination pertaining to client device 104 or to a user of client device 104. VDI agent 124 transmits, to VDI client 134, image frames of the remote desktop running on VM 120 that contains VDI agent 124. An image frame includes information on appearance of the remote desktop running on VM 120, and that information includes pixel color and location information. In addition to an image frame, VDI agent 124 may also transmit metadata of that frame to VDI client 134. The metadata may include x- and y-coordinate locations of a mouse cursor, x- and y-coordinates and size of windows of application(s) 123 open on the remote desktop, which application(s) 123 are running on and/or displayed on the remote desktop of VM 120, and other information.

Figure 2:
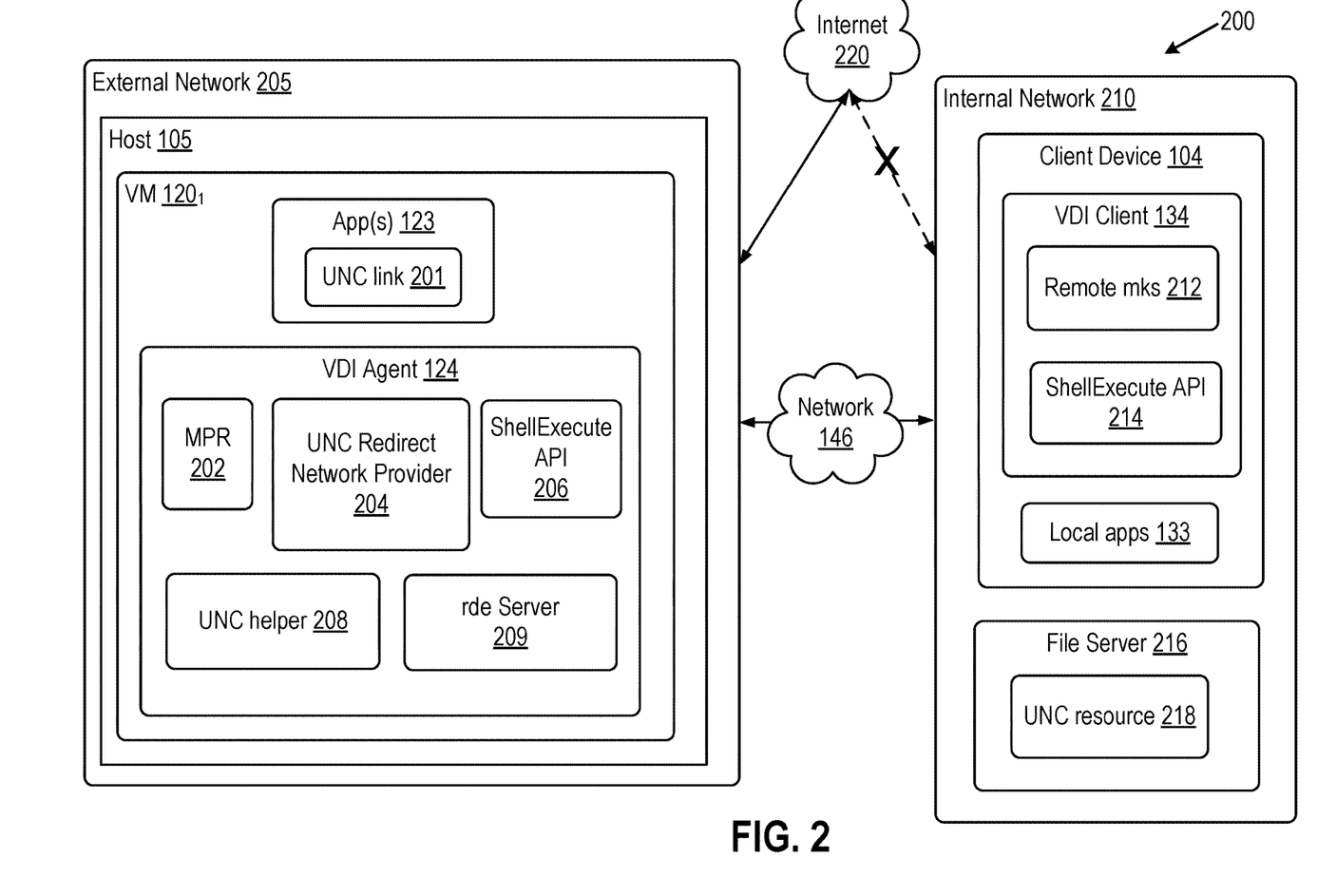
FIG. 2 illustrates an example VDI system in an external network and client device in an internal network configured for UNC path redirection between the client device and a remote desktop, according to an example embodiment of the present disclosure.
Figure 3A:
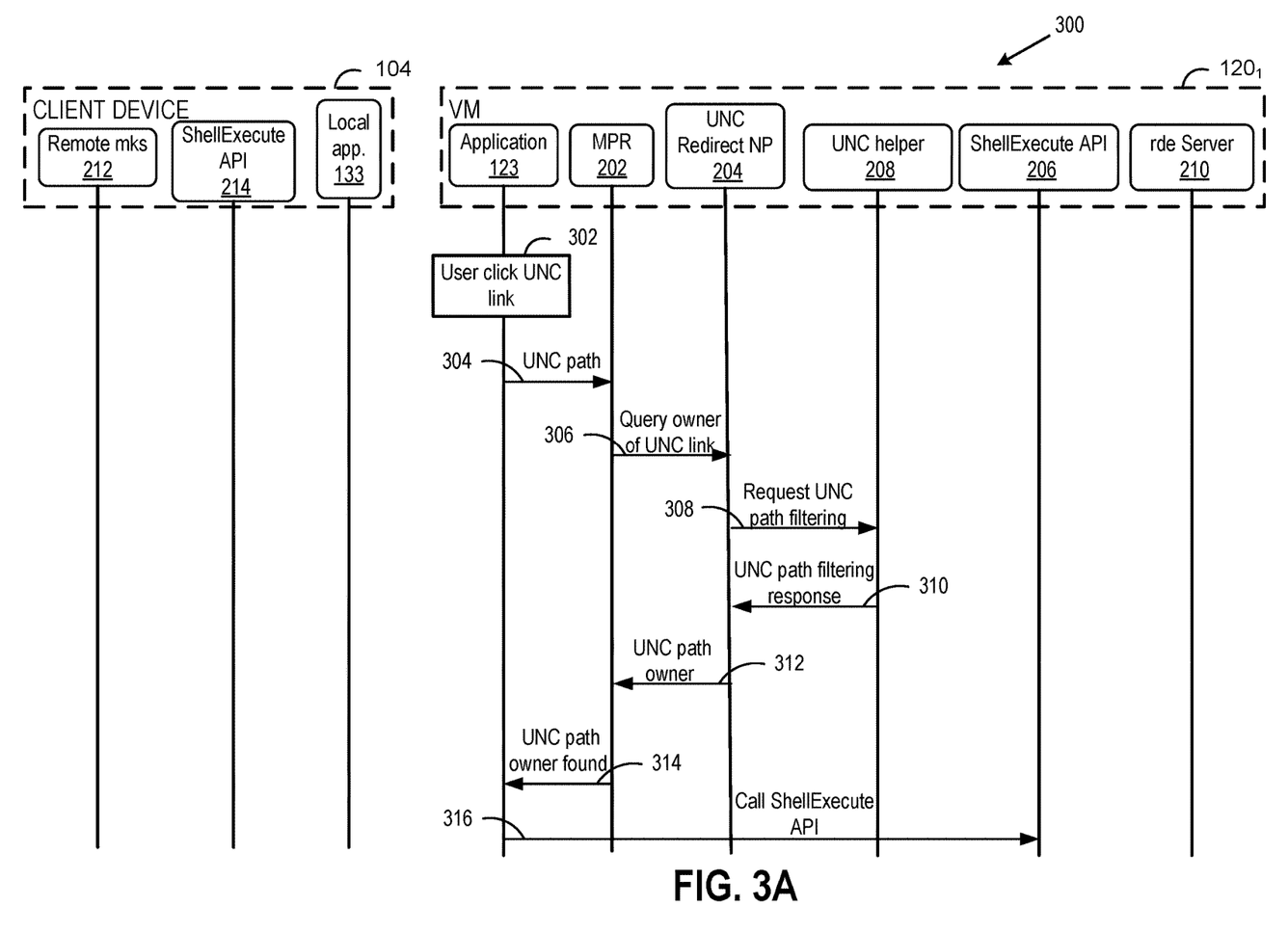
FIGS. 3A-3B illustrate a call flow diagram with example operations for UNC path redirection between a client device and a remote desktop, according to an example embodiment of the present disclosure.
Figure 3B:
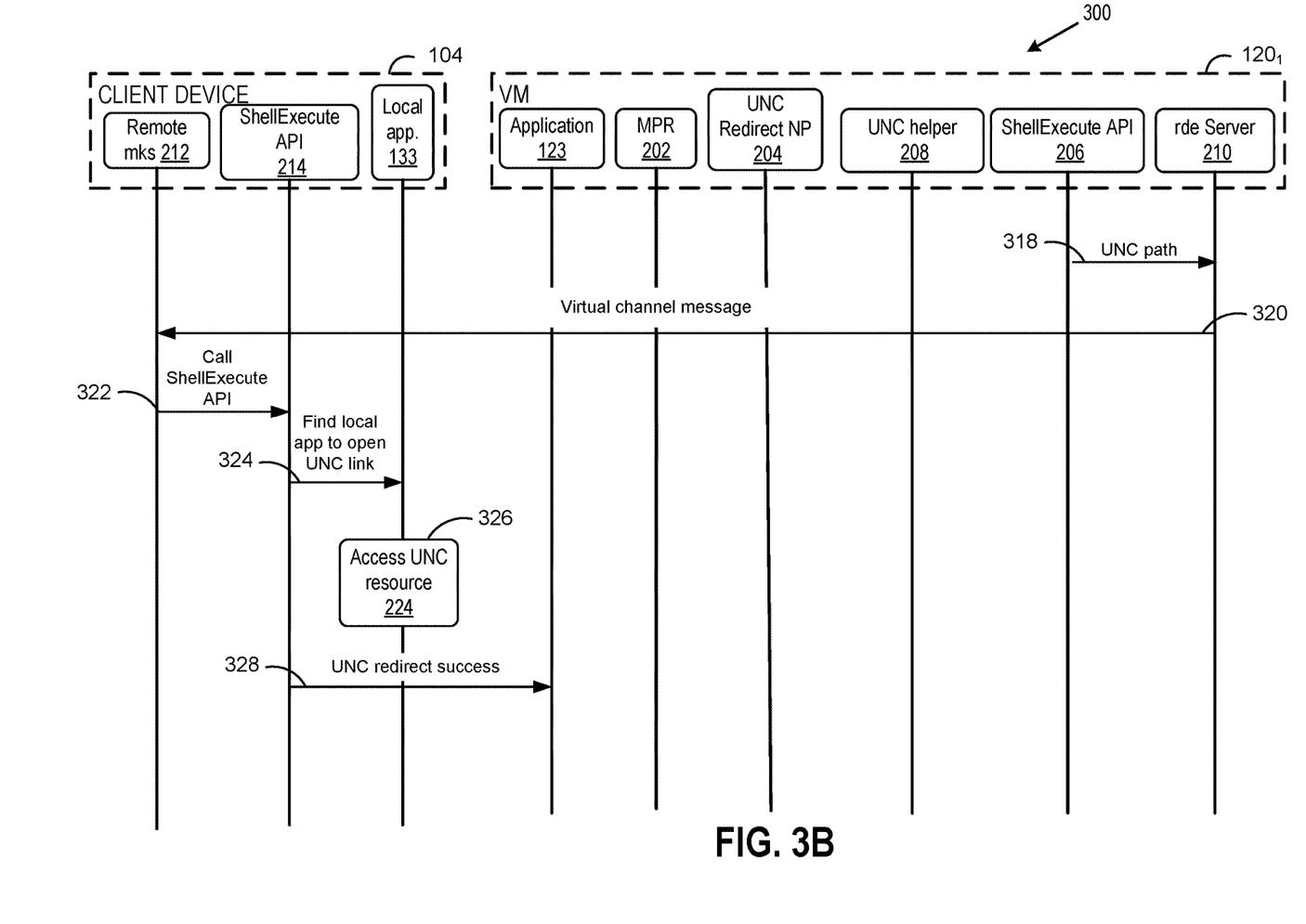

As discussed in more detail herein with respect to FIGS. 2 and 3A-3B, in some embodiments, when a user selects to open a UNC path with an application 123, the application 123 and VDI agent 124 are configured to redirect the UNC path to be opened at client device 104.

Hardware platform 106 of each host 105 includes components of a computing device such as one or more processors (CPUs) 108, memory 110, a network interface card including one or more network adapters, also referred to as Network Interface Cards (NICs) 112, storage system 114, a host bus adapter (HBA) 115, and other input/output (I/O) devices such as, for example, a mouse and keyboard (not shown). CPU 108 is configured to execute instructions, for example, executable instructions that perform one or more operations described herein and that may be stored in memory 110 and in storage system 114. NIC 112 enables host 105 to communicate with other devices via a communication medium, such as management network 128 and/or data network 118. Storage system 114 represents persistent storage devices (e.g., one or more hard disks, flash memory modules, solid state disks (SSDs), and/or optical disks). HBA 115 couples host 105 to one or more external storages (not shown), such as a storage area network (SAN). Other external storages that may be used include network-attached storage (NAS) and other network data storage systems, which may be accessible via NIC 112.

Memory 110 is hardware allowing information, such as executable instructions, configurations, and other data, to be stored and retrieved. Memory 110 is where programs and data are kept when CPU 108 is actively using them. Memory 110 may be volatile memory or non-volatile memory. Volatile or non-persistent memory is memory that needs constant power in order to prevent data from being erased. Volatile memory describes conventional memory, such as dynamic random access memory (DRAM). Non-volatile memory is memory that is persistent (non-volatile). Non-volatile memory is memory that retains its data after having power cycled (turned off and then back on). Non-volatile memory is byte-addressable, random access non-volatile memory.

Virtualization manager 130 communicates with hosts 105 via a network, shown as management network 128, and carries out administrative tasks for data center 102 such as managing hosts 105, managing VMs 120 running within each host 105, provisioning VMs 120, migrating VMs 120 from one host 105 to another host, and load balancing between hosts 105. Virtualization manager 130 may be a computer program that resides and executes in a server in data center 102 or, alternatively, virtualization manager 130 may run as a virtual appliance (e.g., a VM 120) in one of hosts 105. One example of a virtualization manager is the vCenter Server™ product made available from VMware, Inc. of Palo Alto, California.

Gateway 136 provides VMs 120 and other components in data center 102 with connectivity to network 146. Gateway 136 may manage external public internet protocol (IP) addresses for VMs 120, route traffic incoming to and outgoing from data center 102, and provide networking services, such as firewalls, network address translation (NAT), dynamic host configuration protocol (DHCP), and load balancing. Gateway 136 uses data network 118 to transmit data network packets to hosts 105. Gateway 136 may be a VCI, a physical device, or a software module running within host 105. Gateway 136 may include two gateways: a management gateway for management network 128 and a data gateway for data network 118.

FIG. 2 illustrates an example Internet isolation environment 200 including an external network 205 having access to Internet 220 and an internal network 210 that does not have access to Internet 220. The environment is configured for UNC path redirection between a remote and local system. As shown, the external network 205 is connected to internal network 210, such as via network 146 (which may be a non-Internet access, such as a direct link, a WAN, a virtual private network (VPN) connection such as over the Internet, etc.). Details of the components illustrated in FIG. 2 may be further understood with respect to the example operations in the call flow 300 illustrated in FIGS. 3A-3B and described in more detail below. In some embodiments, a firewall policy restricts external network 205 from accessing internal network 210.

It should be noted that while aspects of the present disclosure are described with respect to an internal network and external network in an Internet isolation environment, the techniques described herein for UNC path redirection may be applied for a client device and remote desktop in other environments, including those without Internet isolation.

As shown in FIG. 2, internal network 210 includes client device 104 and file server 216. In some embodiments, file server 216 stores UNC resource 218. It should be understood that while aspects of the present disclosure are described with respect to a UNC resource 218 stored on file sever 216 in internal network 210, UNC resource 218 may be stored on client device 104, on another device in internal network 210, or in another network connected to internal network 210 that is not directly accessible by external network 205. Further, where UNC resource 218 is not a file, UNC resource 218 may itself be a device or resource within internal network 210, or in another network connected to internal network 210 that is not directly accessible by external network 205.

In some embodiments, UNC resource 218 is a shared file (e.g., a txt, mp4, ppt, html, jpg, excel, word, or other file format supported by client device 104), a director, a printer, or other network resource. In some embodiments, the location of UNC resource 218 is specified by a UNC path. For example, the location of UNC resource 218 may be specified by a Network path with a format \\FileServer216Name\SharedFolder\UNCResource218.

As shown, client device 104 includes VDI client 134 and local application(s) 133. One or more local applications 133 may be installed on client device 104. Local applications 133 may include any software program (e.g., word processing applications, image and/or video editing tools, and the like). In some embodiments, client device 104 may configure one or more of local applications 133 as file-handlers for one or more UNC file types, such as for UNC resource 218.

As shown, VDI client 134 may include remote mks (mouse, keyboard, screen) 212 and ShellExecute API 214. Remote mks 212 may be configured for accessing a VM, such as VM $120_1$, running a remote desktop. As described in more detail herein with respect to call flow 300 illustrated in FIG. 3, remote mks 212 may be configured to receive a message for client device 104 from VM $120_1$ via a virtual channel. In some embodiments, the virtual channel is created when client device 104 connects to VDI agent 124. In some embodiments, remote mks 212 is configured to receive a message with a UNC path from client device 104. In some embodiments, when remote mks 212 receives the message with the UNC link, remote mks 212 is configured to call ShellExecute API 214 in client device 104. In some embodiments, remote mks 212 is a server (e.g., Unity Svc server) or a client (e.g., Unity Svc client). One example of remote mks 212 is the Horizon Remote MKS of the Horizon platform.

ShellExecute API 214 is an API that may be configured to find a local application 133 of client device 104 to open a redirected UNC path. In some embodiments, ShellExecute API 214 returns a success message to the application 123 of VM $120_1$ indicating the UNC path is successfully redirected.

In some embodiments, a user of client device 104, in internal network 210, working in a remote desktop, running on VM $120_1$, in external network 205, may wish to open a UNC link to UNC resource 218, on file server 216, in internal network 210. Aspects provided herein for UNC path redirection may enable the user to open the UNC path to UNC resource 218 with a local application 133 on client device 104 as though local application 133 were an application 123 of the remote desktop running on VM $120_1$.

On the remote-side, external network 205 includes host 105 with VM $120_1$ running a remote desktop. VM $120_1$ includes application(s) 123 and VDI agent 124. VDI agent 124 includes a router, MPR 202, UNC redirect network provider 204, an API, ShellExecute API 206, UNC helper 208 module, and remote desktop (rde) server 209.

MPR 202 handles communications between GOS 122 and the installed network providers. A network provider is a dynamic link library (DLL) that enables the OS to support a specific network protocol. A network provider API provides a set of functions that MPR 202 calls to communicate with the network. The network provider then translates these calls into network-specific API calls to perform the action specified by MPR 202, In this way, the OS can interact with the new network protocol without having to understand the network-specific APIs of each network protocol. When MPR 202 is loaded, MPR 202 checks a registry to determine which network providers are installed on the system and the order the network providers should be cycled through. MPR 202 loads all registered network provider DLLs and uses the network provider DLLs to process subsequent calls made by a user interface or other applications 123. MPR 202 may be configured to receive a UNC path from an application 123 when the user selects to open a UNC link. MPR 202 may be configured to query which network provider in the list of registered network providers is the owner of the UNC path and report the UNC path check to the application 123.

In some embodiments, UNC redirect network provider 204 is a module installed at the beginning of the registered network provider list. UNC redirect network provider 204 may act as a third-party network provider DLL. MPR 202 and UNC redirect network provider 204 may be automatically loaded and unloaded. UNC redirect network provider 204 may be configured to receive a query from MPR 202 about who is the owner of a UNC path. In some embodiments, when UNC redirect network provider 204 is loaded, UNC redirect network provider 204 is configured to intercept ShellExecute APIs for network providers loaded by application 123. Accordingly, when a user selects to open a UNC path to a resource located in internal network 210, UNC redirect network provider 204 can check with UNC helper 208 whether the UNC path is to be redirected and, if so, UNC redirect network provider 204 may report that UNC redirect network provider 204 is the owner of the UNC path.

ShellExecute API 206 is an API made commercially available from Microsoft, Corp. of Redmond, Washington. It should be understood that while FIGS. 2-3B are described with respect to opening a network path link in Outlook, with a Windows OS, using an MPR and the ShellExecute API, that the UNC path redirection described herein may be used in other systems with different types of applications, on other operating systems, using different network provider routers and APIs.

UNC helper 208 may be configured to perform UNC path redirection filtering. In some embodiments, UNC helper 208 is preconfigured (e.g., by the user, an administrator, or a default) with a policy for whether to perform UNC path redirection and/or which UNC paths, UNC resource types, or applications 123 associated with the UNC path are to be redirected. Accordingly, UNC helper 208 can inform UNC redirect network provider 204 about whether a UNC path is to be redirected.

Rde server 209 may be configured to communicate with the remote desktop running on VM 120₁ in external network 205. For example, rde server 209 may be configured to communicate with remote mks 212. In some embodiments, rde server 209 communicates via a virtual transport channel.

FIGS. 3A-3B illustrate a call flow diagram 300 with example operations for UNC path redirection between local and remote systems, according to an example embodiment of the present disclosure.

As shown in FIG. 3A, at operation 302, a user of client device 104 selects to open a UNC link, e.g., by clicking the UNC link, from an application 123 of VM 120₁ running a remote desktop in external network 205. In an illustrative example, the user clicks a UNC link in an email from Outlook while working in the remote desktop.

When the user selects to open the UNC link, application 123 loads the MPR. In the illustrative embodiment, outlook.exe loads MPR 202 and call Window networking (WNet) APIs with the UNC path. At 304, the UNC path is provided to the MPR.

At 306, MPR 202 queries the owner of the UNC path. For example, MPR 202 queries the list of registered network providers, where UNC redirect NP is the first network provider queried from the list.

At 308, UNC redirect network provider 204 provides the UNC path to UNC helper 208 for filtering whether the UNC path is to be redirected.

UNC helper 208 can determine whether the UNC path is to be redirected (e.g., based on a configuration). In some embodiments, UNC helper 208 is configured (e.g., by a user or administrator) with a configuration of when to perform UNC path redirection, which UNC paths to redirect, applications and/or resource types to perform UNC path redirection. At 310, UNC helper 208 provides a UNC path filtering response to UNC redirect network provider 204. The UNC path filtering response indicates whether or not the UNC path is to be redirected. In some embodiments, after filtering, if the UNC path is to be redirected, UNC helper 208 sends the UNC path with a redirect label to the UNC redirect network provider 204.

At 312, if the UNC path filtering response indicates the UNC path is to be redirected, UNC redirect network provider 204 responds to MPR 202 that UNC redirect network provider 204 is the owner of the given UNC path. In some embodiments, UNC redirect network provider 204 stores the result in a data structure. Alternatively, if the UNC path filtering response indicates the UNC path is not to be redirected, UNC redirect network provider 204 responds to MPR 202 that UNC redirect network provider 204 is not the owner of the given UNC path and MPR 202 will continue to query other network providers in the registered list of network providers.

At 314, MPR 202 responds to application 123 with the owner of the UNC path.

At 316, after finding the owner of the UNC path, application 123 will call ShellExecute API 206 with the given UNC path to open the UNC link. In some embodiments, the UNC path is provided to ShellExecute API 206 with a redirect label indicating the UNC path is to be redirected.

As shown in FIG. 3B, in some embodiments, at 318, ShellExecute API 206 sends the UNC link to Rde sever 209. Rde server 209 sends the UNC path to the remote mks 212 via the virtual transport channel created when connecting to VDI agent 124. In some embodiments, ShellExecute API 206 first checks the data structure to determine whether the UNC path is to be redirected.

In some embodiments, if the UNC path is to be redirected, ShellExecute API 206 sends the UNC path back to the UNC helper 208 (not shown) to perform additional filtering on whether the UNC path is to be redirected. UNC helper 208 sends the UNC path to the remote side via the virtual transport channel. In some embodiments, the virtual transport channel is a channel used for control information for controlling the VDI. The virtual channel is not prevented by the firewall that restricts VM 120₁ from accessing file server 216.

In some embodiments, at the remote side, a Unity service module (e.g., unity service sever or unity service client) is called to the service the UNC path request. As shown, in some embodiments, at 322, ShellExecute API 214 is called. At 324, ShellExecute API 214 finds a local application 133 (e.g., a default application) to open the UNC path. At 326, ShellExecute API 214 returns a success message to application 123. The UNC link will open seamlessly with the local application 133 of client device 104.

Figure 4A:
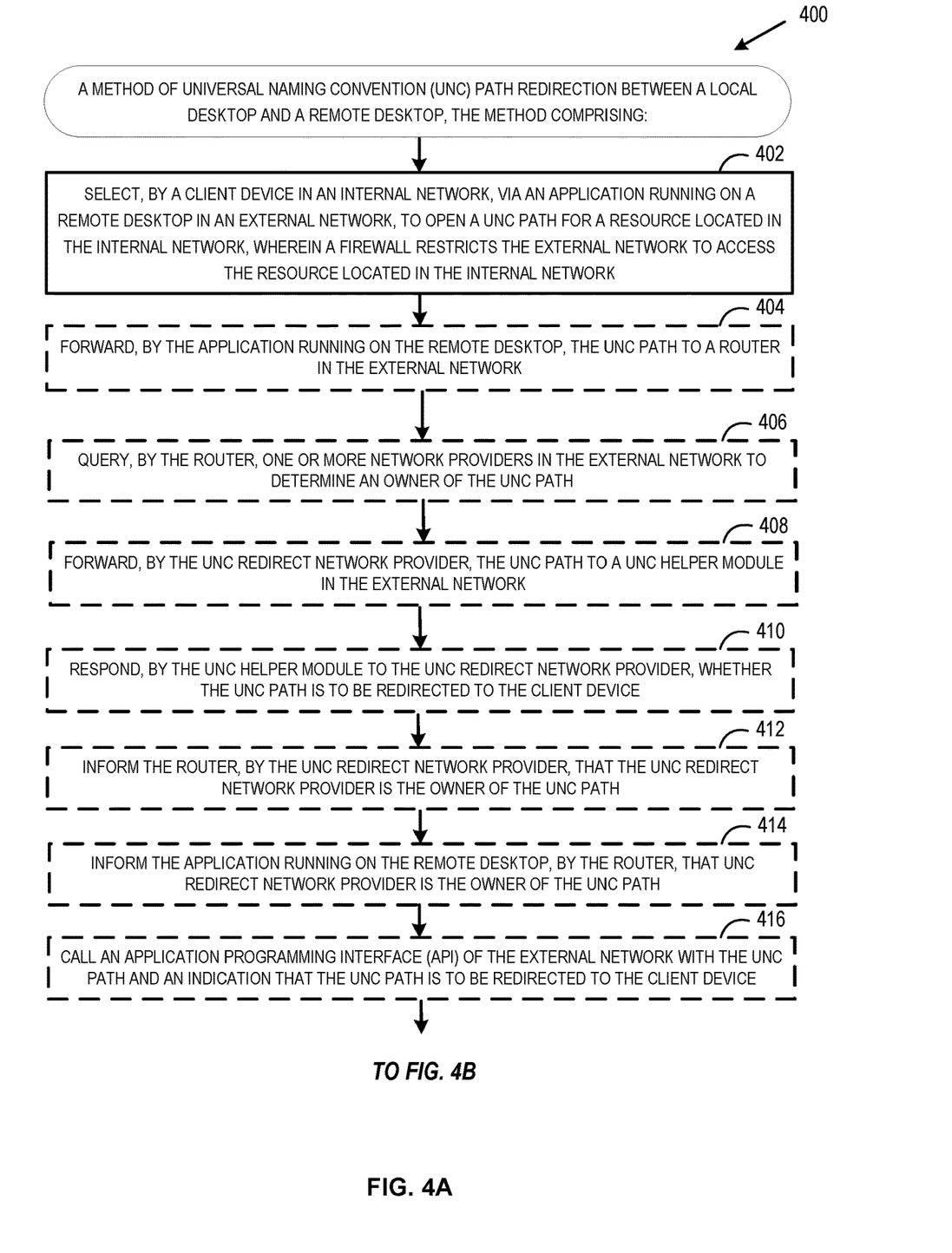
FIGS. 4A-4B is a flow diagram illustrating example operations for UNC path redirection between a client device and a remote desktop, according to an example embodiment of the present application.
Figure 4B:
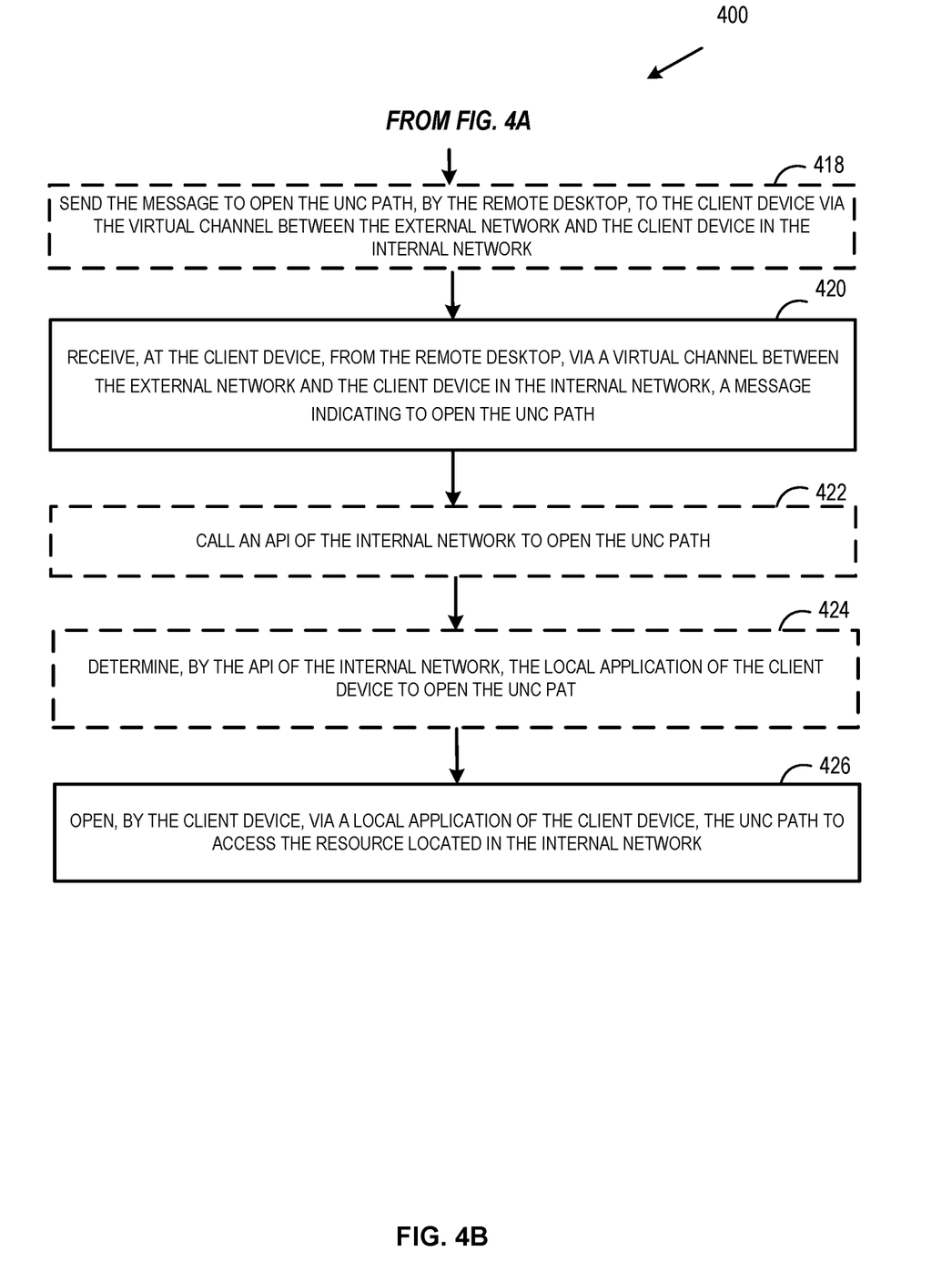

FIGS. 4A-4B are a flow diagram illustrating example operations 400 for UNC path redirection between a local desktop and a remote desktop, according to an example embodiment of the present application. Operations 400 may enable opening the UNC path to a resource (e.g., UNC resource 218) in an internal network (e.g., internal network 210), seamlessly from within a remote desktop (e.g., running on VM 120₁) in an external network (e.g., external network 205), with a local application (e.g., one or more local applications 133) on a client device (e.g., client device 104) in the internal network.

As shown in FIG. 4A, operations 400 may begin, at operation 402, by selecting, by a client device in in an internal network, via an application (e.g., application 123) running on a remote desktop in an external network, to open a UNC path for a resource located in the internal network, wherein a firewall restricts the external network to access the resource located in the internal network In some embodiments, the internal network does not have Internet (e.g., Internet 220) access and the external network has Internet access.

In some embodiments, operations 400 include, at 404, in response to the selecting to open the UNC path, forwarding, by the application running on the remote desktop, the UNC path to a router (e.g., MPR 202) in the external network.

In some embodiments, operations 400 include, at 406, querying, by the router, one or more network providers in the external network to determine an owner of the UNC path. In some embodiments, querying the one or more network providers comprises first querying a UNC redirect network provider (e.g., UNC redirect network provider 204) in a list of registered network providers.

In some embodiments, operations 400 include, at 408, in response to a query from the router, forwarding, by the UNC redirect network provider, the UNC path to a UNC helper module (e.g., UNC helper 208) in the external network.

In some embodiments, operations 400 include, at 410, responding, by the UNC helper module to the UNC redirect network provider, whether the UNC path is to be redirected to the client device.

In some embodiments, operations 400 include, at 412, in response to the UNC helper module responding that the UNC path is to be redirected to the client device, informing the router, by the UNC redirect network provider, that the UNC redirect network provider is the owner of the UNC path.

In some embodiments, operations 400 include, at 414, informing the application running on the remote desktop, by the router, that UNC redirect network provider is the owner of the UNC path.

In some embodiments, operations 400 include, at 416, calling an API (e.g., ShellExecute API 206) of the external network with the UNC path and an indication that the UNC path is to be redirected to the client device.

As shown in FIG. 4A, in some embodiments, operations 400 include, at 418, in response to calling the API, sending the message to open the UNC path, by the remote desktop, to the client device via the virtual channel between the external network and the client device in the internal network.

Operations 400 include, at 420, receiving, at the client device, from the remote desktop, via a virtual channel between the external network and the client device in the internal network, a message indicating to open the UNC path.

In some embodiments, operations 400 include, at 422, in response to the message to open the UNC path, calling an API of the internal network (e.g., ShellExecute API 214) to open the UNC path.

In some embodiments, operations 400 includes, at 424, determining, by the API of the internal network, the local application of the client device to open the UNC path.

Operations 400 include, at 426, opening, by the client device, via a local application of the client device, the UNC path to access the resource located in the internal network.

Accordingly, techniques presented herein for UNC path redirection allow for a user to seamlessly open a UNC link with a local application after selecting the UNC path within a remote desktop and without further user interaction. Aspects may allow a user to access resources within an internal, Internet-isolated, from a remote desktop application in an external network without the user transferring the UNC path between the remote and local desktop.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of universal naming convention (UNC) path redirection between a local desktop and a remote desktop, the method comprising:
    selecting, by a client device in an internal network, via an application running on a remote desktop in an external network, to open a UNC path for a resource located in the internal network, wherein a firewall restricts the external network to access the resource located in the internal network, wherein in response to the selecting to open the UNC path,
        the application running on the remote desktop forwards the UNC path to a router in the external network, and
        the router queries one or more network providers in the external network to determine an owner of the UNC path;
    receiving, at the client device, from the remote desktop, via a virtual channel between the external network and the client device in the internal network, a message indicating to open the UNC path, wherein the message is initiated on the remote desktop based at least in part on the router querying the one or more network providers; and
    opening, by the client device, via a local application of the client device, the UNC path to access the resource located in the internal network.

2. The method of claim 1, wherein the internal network does not have Internet access, and wherein the external network has Internet access.

3. The method of claim 1, wherein querying the one or more network providers by the router comprises first querying a UNC redirect network provider in a list of registered network providers.

4. The method of claim 3, further comprising:
    in response to a query from the router, forwarding, by the UNC redirect network provider, the UNC path to a UNC helper module in the external network; and
    responding, by the UNC helper module to the UNC redirect network provider, whether the UNC path is to be redirected to the client device.

5. The method of claim 4, further comprising:
    in response to the UNC helper module responding that the UNC path is to be redirected to the client device, informing the router, by the UNC redirect network provider, that the UNC redirect network provider is the owner of the UNC path; and
    informing the application running on the remote desktop, by the router, that UNC redirect network provider is the owner of the UNC path.

6. The method of claim 1, further comprising:
    calling an application programming interface (API) of the external network with the UNC path and an indication that the UNC path is to be redirected to the client device; and
    in response to calling the API, sending the message to open the UNC path, by the remote desktop, to the client device via the virtual channel between the external network and the client device in the internal network.

7. The method of claim 6, further comprising:
    in response to the message to open the UNC path, calling an API of the internal network to open the UNC path; and
    determining, by the API of the internal network, the local application of the client device to open the UNC path.

8. A system of universal naming convention (UNC) path redirection between a local desktop and a remote desktop, the system comprising:
    one or more processors; and
    at least one memory, the one or more processors and the at least one memory configured to:
        select, by a client device in an internal network, via an application running on a remote desktop in an external network, to open a UNC path for a resource located in the internal network, wherein a firewall restricts the external network to access the resource located in the internal network, wherein in response to the selecting to open the UNC path,
            the application running on the remote desktop forwards the UNC path to a router in the external network, and
            the router queries one or more network providers in the external network to determine an owner of the UNC path;
        receive, at the client device, from the remote desktop, via a virtual channel between the external network and the client device in the internal network, a message indicating to open the UNC path, wherein the message is initiated on the remote desktop based at least in part on the router querying the one or more network providers; and
        open, by the client device, via a local application of the client device, the UNC path to access the resource located in the internal network.

9. The system of claim 8, wherein the internal network does not have Internet access, and wherein the external network has Internet access.

10. The system of claim 8, wherein querying the one or more network providers by the router comprises first querying a UNC redirect network provider in a list of registered network providers.

11. The system of claim 10, wherein the one or more processors and the at least one memory are further configured to:
    in response to a query from the router, forward, by the UNC redirect network provider, the UNC path to a UNC helper module in the external network; and respond, by the UNC helper module to the UNC redirect network provider, whether the UNC path is to be redirected to the client device.

12. The system of claim 11, wherein the one or more processors and the at least one memory are further configured to:

in response to the UNC helper module responding that the UNC path is to be redirected to the client device, inform the router, by the UNC redirect network provider, that the UNC redirect network provider is the owner of the UNC path; and inform the application running on the remote desktop, by the router, that UNC redirect network provider is the owner of the UNC path.

13. The system of claim 8, wherein the one or more processors and the at least one memory are further configured to:

call an application programming interface (API) of the external network with the UNC path and an indication that the UNC path is to be redirected to the client device; and in response to calling the API, send the message to open the UNC path, by the remote desktop, to the client device via the virtual channel between the external network and the client device in the internal network.

14. The system of claim 13, wherein the one or more processors and the at least one memory are further configured to:

in response to the message to open the UNC path, call an API of the internal network to open the UNC path; and determine, by the API of the internal network, the local application of the client device to open the UNC path.

15. A non-transitory computer-readable medium comprising instructions that, when executed by one or more processors of a computing system, cause the computing system to perform operations for universal naming convention (UNC) path redirection between a local desktop and a remote desktop, the operations comprising:

selecting, by a client device in an internal network, via an application running on a remote desktop in an external network, to open a UNC path for a resource located in the internal network, wherein a firewall restricts the external network to access the resource located in the internal network, wherein in response to the selecting to open the UNC path, the application running on the remote desktop forwards the UNC path to a router in the external network, and the router queries one or more network providers in the external network to determine an owner of the UNC path;

receiving, at the client device, from the remote desktop, via a virtual channel between the external network and the client device in the internal network, a message indicating to open the UNC path, wherein the message is initiated on the remote desktop based at least in part on the router querying the one or more network providers; and opening, by the client device, via a local application of the client device, the UNC path to access the resource located in the internal network.

16. The non-transitory computer-readable medium of claim 15, wherein the operations further comprise:

in response to a query from the router, forwarding, by a UNC redirect network provider, the UNC path to a UNC helper module in the external network; and responding, by the UNC helper module to the UNC redirect network provider, whether the UNC path is to be redirected to the client device.

17. The non-transitory computer-readable medium of claim 16, wherein the operations further comprise:

in response to the UNC helper module responding that the UNC path is to be redirected to the client device, informing the router, by the UNC redirect network provider, that the UNC redirect network provider is the owner of the UNC path; and informing the application running on the remote desktop, by the router, that UNC redirect network provider is the owner of the UNC path.

* * * * *